United States Patent [19]

Tsuboka et al.

[11] 4,303,988
[45] Dec. 1, 1981

[54] RANDOM ACCESSIBLE SIGNAL FILING SYSTEM

[76] Inventors: Eiichi Tsuboka, 4-9-83 Miigaoka, Neyagawa-shi, Osaka-fu; Fumio Maehara, 2-15, Satanakamachi, Moriguchi-shi, Osaka-fu; Hiroshi Fujita, 3-14, Miyukihigashimachi, Neyagawa-shi, Osaka-fu, all of Japan; Yoshiteru Izura, deceased, Late of Osaka, Japan; by Keiko Izura, heir, 3-14-11, Shinsenrikitamachi, Toyonaka-shi, Osaka-fu, Japan

[21] Appl. No.: 45,676

[22] Filed: Jun. 5, 1979

Related U.S. Application Data

[63] Continuation-in-part of Ser. No. 805,224, Jun. 9, 1977, abandoned.

[30] Foreign Application Priority Data

Jun. 16, 1976 [JP] Japan .................................. 51-71506

[51] Int. Cl.³ .............................................. G11B 5/09
[52] U.S. Cl. ....................................... 364/900; 360/32
[58] Field of Search ... 364/200 MS File, 900 MS File; 360/13, 15, 29, 32, 137

[56] References Cited

U.S. PATENT DOCUMENTS

| | | | |
|---|---|---|---|
| 2,905,930 | 9/1959 | Golden | 364/900 |
| 3,197,739 | 7/1965 | Newman | 364/900 |
| 3,293,613 | 12/1966 | Gabor | 364/900 |
| 3,417,377 | 12/1968 | Vietor et al. | 364/900 |
| 3,478,327 | 11/1969 | Barkouki | 364/900 |
| 3,772,657 | 11/1973 | Marsalka et al. | 364/200 |
| 3,936,805 | 2/1976 | Bringol et al. | 364/200 |
| 3,947,826 | 3/1976 | Bockwolot | 364/900 |

Primary Examiner—Gareth D. Shaw
Assistant Examiner—Thomas M. Heckler
Attorney, Agent, or Firm—Wenderoth, Lind & Ponack

[57] ABSTRACT

The present invention is a random accessible signal filing system containing magnetic discs, at least two buffer memories and a circuit for controlling the buffer memories in such a way that the write-in and read-out of at least two of the buffer memories may be alternately performed, whereby through random access, the required signals are selected and read out so as to be outputted as a series of signals.

In this system, during the outputting of the signals, the signals coming from the magnetic discs are written into one of the buffer memories sector by sector at the read-out speed of the magnetic discs, and thereafter, are read out at the demodulating speed of the demodulator. The two buffer memories are so controlled that while the signals are written into one of them; the signals are read out from the other.

5 Claims, 5 Drawing Figures

RANDOM ACCESSIBLE SIGNAL FILING SYSTEM

This is a continuation-in-part of Application Ser. No. 805,224, filed June 9, 1977, abandoned.

BACKGROUND OF THE INVENTION

The present invention relates to a random accessible filing system for producing continuous signals, and particularly pertains to a filing system equipped with magnetic discs and adapted to select, through random access, the signals recorded with the address on the magnetic discs; said signals to be prepared and fed out as a series of signals.

Today, from every broadcasting station, signals of commercials (hereinafter referred to as CMs) are put out during the intermissions between programs, and the number of CM messages is very large, amounting, for example, to about 400 kinds per day, or about 1,000 per week on the average. These broadcasting stations should as part of their daily business in order to feed out the continuous signals for producing the CM messages, select and edit CMs to be fed out daily in the feed-out sequence from among the CMs of about 2,000 kinds of stock tapes with a 20 second average run. If done manually, this task is really intolerable.

In some broadcasting stations, this work is performed automatically by mechanizing the necessary operations for the CM feed-out. One approach is that the required CMs (for example, about 2,000 kinds) are registered on multitrack tape recorders capable of an automatic search function; then, the information designating the CMs to be fed out is received by the use of a typewriter or tape reader, etc., and in that sequence, the specified CMs are successively outputted by implementing the automatic search function. Outside, this output is recorded on another tape recorder, so that the edited tape unified in the feed-out sequence of the CMs may be obtained.

The disadvantage of this method is that a long time is taken because the search is made by the travel of the tape, and must be conducted successively from one end of the tape. Thus, the edited tape should always be prepared once in the unified form, and then, fed out. Accordingly, it is impossible to perform the search and automatic feed-out in real time. Moreover, any additions, revisions, etc., if required, after the unified edited tape is prepared, are very difficult to make. Besides, because analogue type recording has been adopted, deterioration with time resulting from transcriptions, etc., of the CM record tapes, deterioration from rerecording and other deteriorations in signal characteristics are pronounced.

Among the other methods for automating the CM feed out is the method of real time automatic feed-out, in which the required CMs are automatically sought and fed out in keeping with the required timing. In one method presently in practical use, an arbitrary tape recorder is selected from among cartridge type tape recorders prepared in the required number (about 1,000 kinds), the use of a switcher to feed out the CM. This method requires a large scale system, and large numbers of tape recorders must be used, so that it is less reliable. Moreover, as this method is also based on an analog type recording, the deterioration with time of the recording signal characteristics, deterioration from rerecording, etc., are unavoidable.

As a method for realizing CM automatic feed-out devices capable of operation with high efficiencies and speeds by overcoming the difficulties in the two methods mentioned above, the approach of digitally recording the audio signals on digital magnetic discs may be considered useful. However, to achieve the digital recording of the voice data of about 1,000 kinds and with such high quality as required by the standards for broadcasting, magnetic disc devices with as high a capacity as several hundred mega-bites are necessary. Since in such large magnetic disc devices, data transfer at high speeds is required, the data is transferred generally by clock pulses at high frequency. Accordingly, for the control of such large magnetic discs, large computers capable of operation at high data transfer speeds are necessary. Such computers are not suited for the above-described purpose by reason of their high prices and large sizes, etc.

SUMMARY OF THE INVENTION

The present invention has the object of realizing a signal filing system in which by adopting, for the central processing system of the computer, two types of memories, one of them to control the discs, and the other composed of at least two buffer memories to control the buffering and processing of the data, the central processing system and the circuit sections attached thereto being composed of elements, including microcomputer chips, etc., which are relatively small in size, low priced and incapable of high speed processing, thereby enabling the control of the large magnetic discs and thus, the realization of the signal filing system capable of automatic feed-out of CM, etc., throught high speed real time random access.

BRIEF DESCRIPTION OF THE DRAWINGS

FIG. 5 exhibits a diagram showing a 3-state buffer employed in an embodiment of this invention.

DESCRIPTION OF THE PREFERRED EMBODIMENTS

Figure 1:
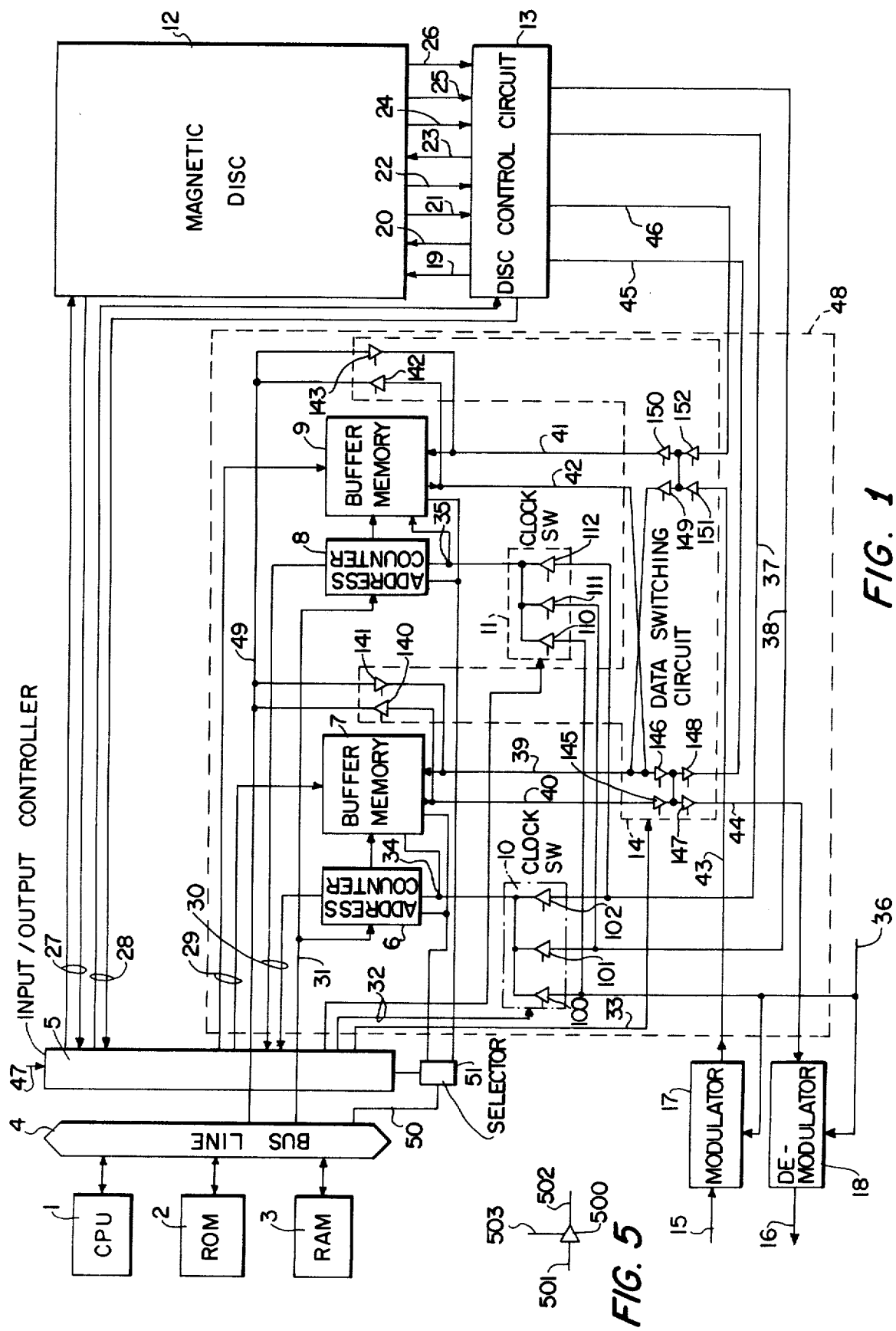
FIG. 1 exhibits a block diagram showing the filing system, an embodiment of this invention.

FIG. 1 exhibits a filing device which comprises an embodiment of this invention. This device is roughly divided into the following two sections. One section is composed of a central processing unit 1 (hereinafter referred to as CPU), read-only memory 2 (hereinafter referred to as ROM), random access memory 3 (hereinafter referred to as RAM) and a bus line 4 connecting them, which controls the part of the device used for selecting the address of a magnetic disc unit 12, that is, the control of the search operation, head selection, sector selection, etc., and which controls each part of the signal system. These control signals are fed to each part of the device through an input-output controller 5 connected to the bus line 4 which may be of conventional design. The procedure for the control of each part is programmed beforehand in ROM 2, and CPU 1 takes the successive steps of control, following this program.

Figure 2:
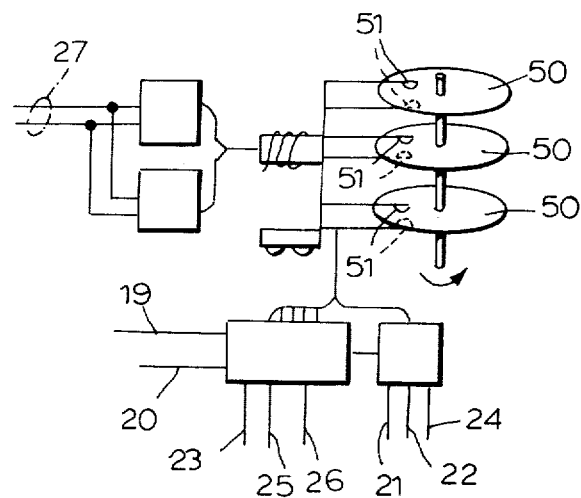
FIG. 2 presents a diagram showing the composition of the magnetic discs of FIG. 1.

For the aforementioned magnetic disc unit 12 used in this system, the magnetic discs for the auxiliary memory of computers, etc., are utilized. FIG. 2 shows an example of a magnetic disc unit used in this system. Its operation is noted below.

Figure 3:
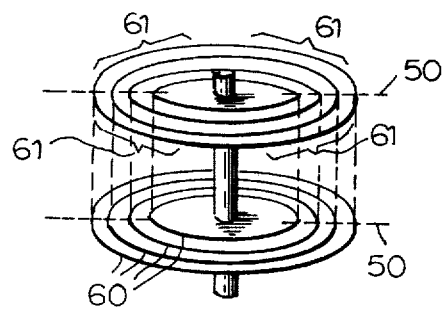
FIG. 3 represents a diagram showing the magnetic discs of FIG. 2 being in the state of recording.

In the magnetic disc unit, a head 51 is moved on a turning disc 50 coated with a magnetic material, to record the data concentrically. The number of heads 50 correspond to the number of discs 50. For the addressing operation for recording and regenerating the data, the cylinder address is first provided through a signal line 27. Thereupon, the head 51 on the disc surface searches the one concentric circle corresponding to the cylinder address, so that one of cylinders 60, as shown in FIG. 3, is selected. Upon completion of this operation, the head address is provided to the signal line 27. Thereupon, one of the heads 51 corresponding to each surface of the discs 50 is selected.

As the cylinder and the head are selected, the index pulse and the sector pulse appear on the signal lines 21 and 22. These pulses are entered as input into the magnetic disc control circuit, to be utilized for identifying the data containing segment of the concentric circle.

In CPU 1, at the point in time when the magnetic address consisting of the cylinder, head and sector is selected, for the write-in into the magnetic disc unit 12, the data to be written in is fed to a disc control circuit 13 through a signal line 28, and simultaneously therewith, the magnetic disc control circuit 13 is switched so that the data, then obtained in the modified form, may be recorded in the magnetic disc unit 12. For the read-out operation, the reverse order is followed. Thus, by switching the magnetic disc control circuit 13, the data is read out from the magnetic disc so that the data, restored to its original form, is taken out to a signal line 46.

Another part of the filing system shown in FIG. 1 is the section for handling the record and play signals, which is composed of two random access buffer memories 7 and 9, address counters 6 and 8 for indicating the addresses of the buffer memories 7 and 9, a data switching circuit 14 for switching the flow of data in a fashion such as receiving the signals from either of the buffer memories 7 and 9, writing them into the magnetic disc unit 12, reading the data output of the magnetic disc unit and writing same into the buffer memories, etc., for controlling the disc control circuit 13 for aligning the form of the data to be written into or read out from the magnetic disc unit 12. Reference numeral 17 denotes a modulator for modulating the CM signal 15 coming from outside, and 18 denotes a demodulator.

The data switching circuit 14 and the clock switching circuits 10 and 11 are respectively composed of a 3-state buffer. FIG. 5 shows a 3-state buffer. In FIG. 5, numeral 500 designates a buffer; 501, an input terminal; 502, an output terminal; and 503, a terminal provided to set the buffer 500 to either an enable or disable state. When the buffer 500 is in its enable state, an input signal at the input terminal 501 is available as an output from the output terminal 502 either unchanged or inverted. On the other hand, when the buffer 500 is in its disable state, an input signal at the input terminal 501 is not transmitted to the output terminal 502 because the output terminal becomes a high impedence and is equivalent to an open state. The buffer 500 can take either state by changing the level of the voltage at the terminal 503. Namely, when voltage impressed at terminal 503 is high, the buffer 500 is in its enable state, but when voltage impressed at terminal 503 is low, the buffer 500 is in its disable state. The enable terminals of the 3-state buffers employed in the data switching circuit 14 and the clock switching circuits 10 and 11 are respectively connected to the input-output controller 5. By setting any of their buffers to the enable state, it is possible to optionally select as the device which transmits an input signal or receives an output signal from the buffer memories 7 and 9, any device from the group consisting of the bus line 4, the modulator 17, the demodulator 18 and the magnetic disc 12. Further, it is also possible to optionally select, as a clock pulse signal to drive the buffer memories 7 and 9, any signal from the group consisting of a sampling pulse from terminal 36, a write-in clock impressed from the disc control circuit 13 through signal line 37, and a read-out clock pulse transmitted through signal line 38. In FIG. 1, an input-output line for buffer memories 7 and 9 is shown by one line, but in actuality, plural lines are provided because plural numbers of 3-state buffers are arranged in respective rows for every bite to transfer a plural number of bites at the same time.

In further detail, clock switch 10 has three signal inputs 36, 38, and 37 respectively controlled by buffers 100, 101, and 102 and has one signal output 34. Control line 32, connected to clock switch 10, is shown in FIG. 1 as a single line, but is in fact a plurality of lines connected to buffers 100, 101, and 102. When line 37 is to be connected to line 34 by clock switch 10, buffer 100 is placed in its enable state by control line 32 and buffers 101 and 102 are placed in their disable state. When line 38 is to be connected to line 34 by clock switch 10, buffer 101 is placed in its enable state by control line 32 and buffers 100 and 102 are placed in their disable state. A similar operation is performed with respect to line 37 and buffer 102. The actual interconnection of line 32 to buffers 100-102 has been omitted from FIG. 1 for clarity but is apparent to those skilled in the art.

Clock switch 11 performs in the identical fashion to clock switch 10.

Data switching circuit 14 operates in a similar fashion to clock switch circuit 10 and 11, but is somewhat more complicated in that it has four input lines 40, 42, 43, and 46, four output lines 39, 41, 44, and 45, and one line 49 which serves as both an input and output line. As in the case of control line 32, control line 33 is illustrated in FIG. 1 as a single line for clarity, but is actually a plurality of lines connected to buffers 140-143 and 145-152 of the data switching circuit 14. However, the interconnection of the plurality of lines comprising control line 33 is apparent to those skilled in the art.

In the following, the operation of the embodiment composed as above described is explained. First, when recording the necessary CM in the magnetic disc unit 12, the following procedure is followed. The signal of the CM desired to be recorded, for example, the output from a tape recorder, amplifier, etc., is applied to a terminal 15. To the terminal 36, a sampling pulse signal with a specified frequency produced by sampling pulse signal generator (not shown) is fed as the input. The frequency of this sampling signal pulse is determined in conformity with sampling theory. In this condition, the start signal for directing the starting of the recording and the identification number corresponding to the CM which is to be recorded is provided at the terminal 47; then, CPU 1 makes an allotment of the address of the magnetic disc unit 12. The correspondence between the CM number and the disc address is stored inside RAM 3. Then, the data switching circuit 14 is so controlled that signal lines 43 and 39, and 42 and 45, are respectively linked. In this case, buffers 149,151,146 and 148 are in their enable state. Furthermore, a clock switching circuit 10 is set to have the sampling pulse signal 36 connected to an address counter 6. In this case, buffer 100 is in its enable state. At the same time, a write clock pulse 37 with which the data is written into the magnetic disc unit 12 is inputted to the address counter 8 through a clock switching circuit 11. In this case, buffer 112 is in its enable state.

Upon completion of the above described setting, CPU 1 inputs the analog signal from terminal 15. This analog signal enters the modulator 17, wherein it is converted into a digital signal which is synchronous with the pulse signal entered as the input from the terminal 36. This digital signal enters the data switching circuit 14 through the signal line 43. This digital signal is finally entered as the input into the buffer memory 7, since the signal line 43 has been coupled to the signal line 39 by enabled buffer elements 149 and 151 in the data switching circuit. In the address counter 6, +1 is registered every time one sample of the digital signal is entered as the input; in that way, the continuous samples of the digital signal are successively stored in the buffer memory 7. The address counter 6 is so constructed that overflow occurs just when the buffer memory 7 is filled up, and thereupon, this overflow is noted by CPU 1 through a signal line 30 and the input-output controller 5. When the input signal is stored in the buffer memory by the above-described operation, CPU 1 simultaneously provides the cylinder address to the magnetic disc unit 12 through the input-output controller 5 and the signal line 27, thereby causing the disc unit 12 to conduct a search operation. Upon completion of the search operation, the head address is given, and the sector address selected at the head is provided, so as to make the selection of the sector. The time required between providing the cylinder address and selecting the sector is shorter than the time for the input signal to be stored in the buffer memory 7, and shorter than the time for the content of the buffer memory 7 or 9 to be read out through a signal line 44.

CPU 1, upon receiving the overflow signal from the buffer memory 7, issues the control signal to the data switching circuit 14 through a signal line 33, thereby causing the connection of signal lines 43 and 41; and 40 and 45, and further, switching the clock switching circuits 10, 11 through a signal line 32, to enter, as the input into the address counter 6, the write clock signal available on a signal line 37, and to input, into the address counter 8, the sample clock signal available on the signal line 36. In this case, buffers 151,150,145,148,102 and 110 are in an enable state. At this point, the data stored in the buffer memory is entered into the magnetic disc control circuit 13 through the signal line 45, where its data format is arranged, is then inputted to the magnetic disc unit 12. Concurrently therewith, the digital signal input from the modulator 17 is applied to the buffer memory 9 through enabled buffers 150 and 151. The data transferring speed to the magnetic disc unit 12 is sufficiently higher than the data transferring speed from the modulator 17 to cause the buffer memory 7 to be emptied before the buffer memory 9 is filled up; then, the address counter 6 produces an overflow signal, informs CPU 1 of overflow, and stays in readiness. Later, as CPU 1 is informed of the buffer memory 9 overflow, it returns to its former condition, with the data switching circuit 14 being so switched as to connect the signal lines 43 and 39, and 42 and 45, and the clock switching circuits 10, 11 so switched as to link the signal lines 36 and 34, and the signal lines 37 and 35, whereby inputted into the buffer memory 7 is the signal data of the modulator 17, and the data previously stored in the buffer memory 9 is transferred to the magnetic disc unit 12. This operation is successively repeated.

Upon completion of the operation with one reel of CM data, CPU 1 is notified through the signal line 47. Then, CPU 1 completes the operation with the CM input by writing all the data in the buffer memories 7 and 9 into the magnetic disc unit 12.

In the following, the operation performed when feeding out the CM data stored in the magnetic disc unit 12 is described.

When a request for play is made, the operation for play is requested of CPU 1 through the signal line 47 from outside with the signal for the request for play and the number of the CM to be played (the number registered at the time of recording) carried thereon. CPU 1, upon receiving the request for play, the addresses of the magnetic disc unit 12 with which this CM is registered (cylinder address, head address and sector address) are read out from RAM 3 by reference to the number of the CM, and concurrently therewith, they are input to the magnetic disc unit 12 through the input-output controller 5 and the signal line 27, thereby selecting the addresses of the required discs. For this search operation of the magnetic disc unit 12, at least several milliseconds are required. During this period of time, CPU 1 provides the control signal to the date switching circuit 14, to so control the data switching circuit 14 so as to input the signal read out from the magnetic disc unit 12 into the buffer memory 7. In this case, buffers 149 and 152 are in an enable state. Thus, the signal line 46 and the signal line 39 are connected, and further, the clock pulse (produced on the signal line 38) formed with the pulse synchronized with the data read out from the magnetic disc unit 12 is applied to the signal line 34. In this case, buffer 101 is in an enable state. Concurrent with this timing, the address counter 6 is operated. At the point in time when the search operation of the magnetic disc unit 12 has been completed, and the specified addresses of the magnetic disc unit 12 are selected, the data is read out through a signal line 25, then, read out through the signal line 46 with the format of the data restored by means of the magnetic disc control circuit 13, and the data is read into the buffer memory 7. As soon as the buffer memory 7 is filled up, the address counter 6 undergoes an overfow. Then, simultaneously with the notification of the overflow to CPU 1, the count stored in address counter 6 comes to a stop at zero.

At this time, CPU 1 switches the data switching circuit 14, to connect the read out data signal line 46 to the signal line 41, and a read-out signal line 40 of the buffer memory 7 to a signal line 44, so that the signal may be fed to the demodulator 18. In this case, buffers 152,150,145 and 147 are in an enable state. Simultaneously therewith, switchings of clock pulses are made at the clock switching circuits 10, 11 to make the connections between the signal lines 36 and 34, and 38 and 35. In this case, buffers 100 and 112 are in an enable state. Thereafter the contents of the buffer memory 7 is read out to the demodulator 18 in synchronism with the sample clock pulse of the signal line 36; the digital signal is converted in the demodulator into the form of an analog signal, thereby regenerating the former CM signal. Concurrently, the signal coming from the magnetic disc unit 12 is read into the buffer memory 9 in synchronism with the clock pulse of the signal line 35.

Since the write-in into the buffer memory 9 is performed at a more rapid rate than the read-out by the buffer memory to the demodulator 18, the buffer memory 9 is filled up before the buffer memory 7 is emptied. Thereupon, the address counter 8, sensing the overflow, transmits the signal to CPU 1, and simultaneously, comes to a stop at count of zero. Thereafter, as the buffer memory 7 has run out, the address counter 6 undergoes an overflow, and CPU 1 is notified of it. Thereupon, CPU 1 operates the data switching circuit 14 and the clock switching circuits 10, 11, to make the switchings of the signal lines to 42 and 44, 46 and 39, 38 and 34, and 36 and 35, so that concurrently with the transferring of the data from the magnetic disc unit to the buffer memory 7, the data in the buffer memory 9 is withdrawn as the output through the demodulator 18. In this case, buffers 146,147,149,152,101 and 110 are in an enable state.

By repetitively following the above described procedure, all the data in the required addresses of the magnetic disc unit 12 is taken out as the output, thereby completing the delivery of a CM.

In the following section, the operation of this system as a CM automatic sender is described. Previously, the required number of CMs have been recorded in the magnetic disc unit 12 by the operation described above. At the time of sending, the numbers of the CMs to be sent out (which are designated at the time of registration of the CM) are provided at the signal line 47 in the sending order of the CM and at the specified time invervals, and simultaneously therewith, the request for send-out is similarly provided at the signal line 47. Upon receiving the request for send-out through the signal line 47, CPU 1 is informed of the addresses allotted to the magnetic discs by means of the data stored in RAM 3, and the automatic send-out of a CM is made possible by repeating the operation of taking out and sending out the data therefrom.

In this connection, input and output terminals of the buffer memories 7 and 9 are connected to the bus line 4 through 3-state buffers 140–143, as shown in FIG. 1. Preset inputs of the address counters 6 and 8 are transmitted from the bus line 4 through a signal line 31. Load signals for the preset inputs of the address counters 6 and 8, and write-in and read-out clock pulses are supplied from the bus line 4 through a signal line 50 and a selector 51. The selector 51 is a gate provided for selectively connecting the CPU 1 to one of the address counters 6 and 8 and to one of the buffer memories 7 and 9. Thus, the buffer memories 7 and 9 can function like the RAM 3, so that data from CPU 1 may be read out and written in an optional address in the buffer memories 7 and 9. Therefore, it becomes possible that CPU 1 reads out and writes in the magnetic disc 12. When data from CPU 1 is written in the magnetic disc 12 through the buffer memory 7, the buffer 141 is set to an enable state and the selector 51 selects the address counter 6 and the buffer memory 7. In this state, predetermined data from the CPU 1 is written in the buffer memory 7. Then the buffers 145, 148 and 102 are set to an enable state and data in the buffer memory 7 is transfered into the magnetic disc 12. A write-in portion on the magnetic disc 12 can be indicated in the same way as described above, thereby being previously selected. Thus, predetermined data is written in a predetermined portion on the magnetic disc 12. On the other hand, when data in the magnetic disc 12 is read out by the CPU through the buffer memory 7, the buffers 152, 149 and 101 are set to an enable state and predetermined data in a predetermined portion on the magnetic disc 12 is transfered into the buffer memory 7. Then the buffer 140 is set to an enable state and the selector 51 selects the address counter 6 and the buffer memory 7. In this state, data in the buffer memory 7 may be read out from part of the CPU. Thus, data in a predetermined portion on the magnetic disc 12 may be known through part of the CPU. A read-out portion on the magnetic disc 12 may be indicated in the same way as described above. Furthermore, by the provision of the buffer memory, it becomes possible to connect microcomputer with a low processing rate to a magnetic disc with a large capacity and a high processing rate. The buffer memory provided for the input and output of an audio signal to the magnetic disc may be utilized to transfer data between a magnetic disc and a CPU.

The embodiment shown in FIG. 1 employs a construction in which the buffer memories are installed separately from the programming memories of the computer, so that the buffer memories are operated by arbitrary clock pulses, thereby providing a construction such that no high speed processing ability is required of the CPU part of the computer. Moreover, the provision of two buffer memories permits the execution of the program in the buffer memories or the parallel transfers of the data between the buffer memories and the outside and between the magnetic discs and the buffer memories to be made, and for this reason, the program and the communications with signals with the outside are not interrupted, enabling its application as an ideal partial memory system.

Figure 4:
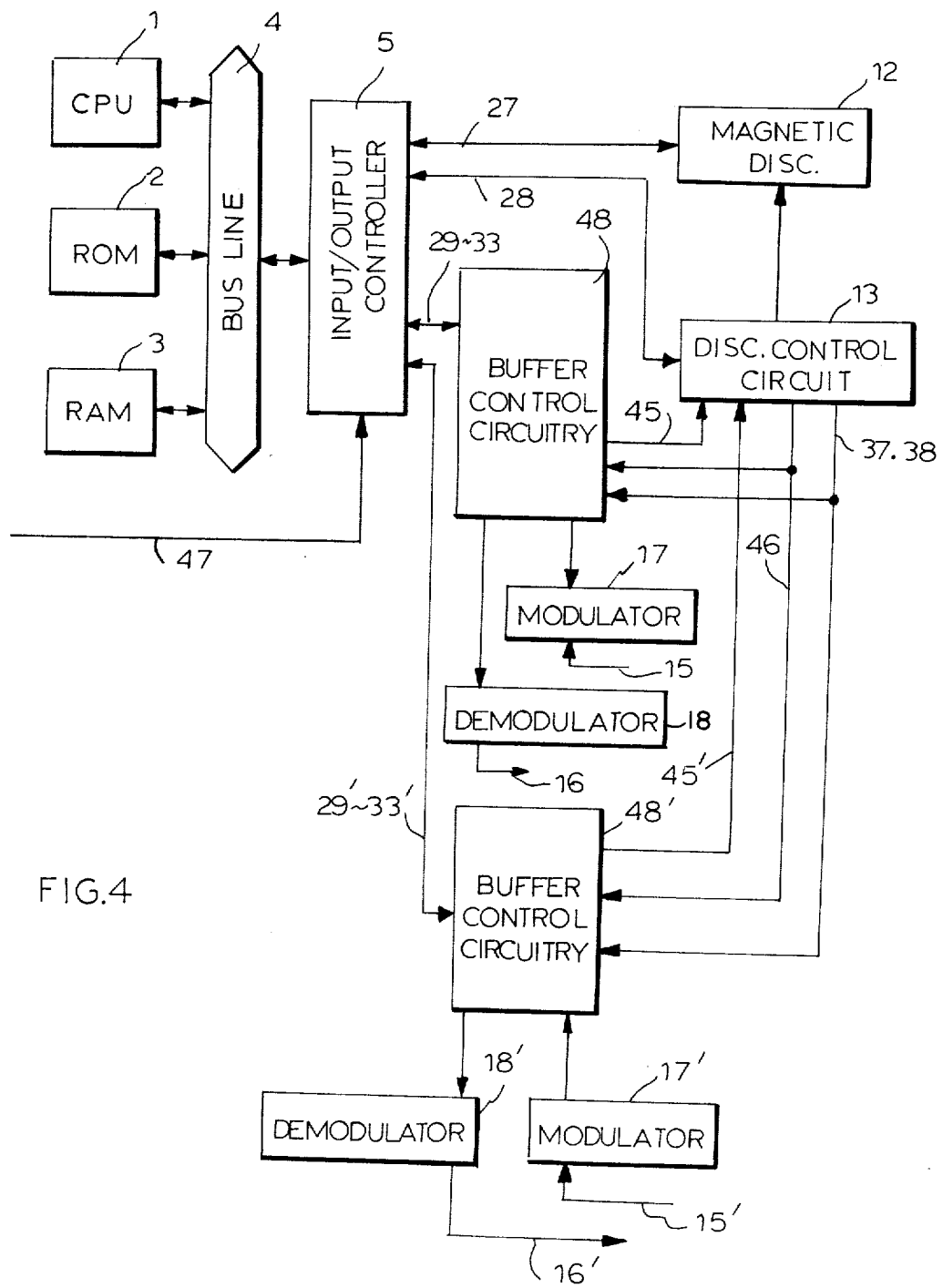
FIG. 4 displays a block diagram showing a filing system, another embodiment of this ivnention.

In another embodiment, simultaneous transfer to the magnetic disc unit, in which a plural type of independent data is recorded, is made possible by adopting a construction having a plural number of buffer control circuits, each being the part circumscribed by the dotted line in FIG. 1, (i.e. element 48), including buffer memories 7 and 9, address counters 6 and 8, clock switching circuits 10 and 11 and data switching circuit 14. FIG. 4 shows a block diagram of such an alternative construction, wherein the system is provided with buffer control circuitry 48' identical with the buffer control circuitry 48. In this figure, the numerals applied commonly with those of FIG. 1 identify the same circuits. When two types of different signals are desired to be entered as the input, for instance in the case of simultaneously recording the picture images and voices, the signal to be entered as the input are provided at the signal line 15 and another signal line 15', and the respective registration numbers (corresponding to the CM numbers) are entered so as to request their recordings; then, the signals each are once entered into the buffer control circuits. The buffer control circuits are respectively provided with independent two buffer memories, their operation being just as that described with reference to FIG. 1. Now, just when one of the buffer memories of each of the buffer control circuits 48, 48', is filled up, the data is transferred to the magnetic disc unit 12 from the circuitry 48 and the circuitry 48' in the order mentioned. The data transfer speed to the magnetic disc unit 12 is sufficiently higher than the data transfer speed from the modulators 17, 17' to the buffer memory circuits 48, 48' to foreclose the possibility of the other buffer memory of each of the buffer control circuits being filled up during the transfer of data to the magnetic disc unit 12. Thus, as observed from the side of the input signal lines 15, 15', the signals are simultaneously entered in parallel.

For the playback operation, quite the same procedure is applied. Thus, the data stored in the two separate magnetic disc address counters are outputted to the buffer control circuits in the specified order. Thereafter, the data in the buffer memories are simultaneously but separately outputted through the demodulators 18 and 18'. In that way, simultaneous play of two systems is possible. Besides, when this construction is utilized, it is also possible to playback one signal, while simultaneously recording another. Thus, when the operations of record and play are simultaneously desired, while the data to be recorded is inputted into one of the buffer control circuits, the required address for the magnetic disc unit is sought, so as to enter the data into the other buffer control circuitry, and then, the data is outputted to the signal line through the demodulator. In that way, the same simple concept of record and playback is applicable.

While, with the foregoing embodiments, a system provided with two sets of buffer memories is described, this description is likewise applicable to systems with three or more sets of memories.

The above described embodiments clearly show that according to this invention, automatic send-out at random access real time and with high speed seek capability is realizable, and yet still higher reliability is assured. Besides, this system, being of digital recording type, is immune to deterioration with time or that due to rerecording, permitting quality data to be securely stored for a long time. Furthermore, the ease of registration, change or revision of a CM, etc., made possible by this system would reduce restrictions on the aspect of CM operation at the broadcasting stations, thereby assisting in creating appreciable room for their business activities.

Moreover, since the connections with other computers may be made easily through its input-output controller, easy on-line cooperation with central computers is possible. Besides, not only the addition of correction marks, etc., may easily be made at the time of recording into the magnetic discs, thereby enabling realization of recording quality data, but the recording of picture image or other various analog signals, not to mention voice signals, may also be made, and large capacity filing of digital data is possible. Further still, in the large capacity computers of the so-called virtual memory formula, not merely the input signal and digital processing may be handled by connecting the buffer memories to the bus line through the input-output controller, but the large capacity programs may be successively taken out from the magnetic discs to put them into execution.

Furthermore, if the construction provided with a plural number of buffer control circuits is employed, a multiple access formula which enables a single file to be jointly used at separate places, becomes feasible, in addition to such features as record-play of multi-channel stereo signals, or simultaneous play of picture images and voices, etc., because the input-output may then be simultaneously effected at random from a large number of channels.

What we claim is:

1. A random access digital singal recording and reproducing system comprising:

a sampling pulse signal generator for generating a sampling pulse signal;

a modulator coupled to said sampling pulse generator for receiving externally produced analog signals and converting said analog signals into digital signals in accordance with said sampling pulse signal;

a demodulator coupled to said sampling pulse generator for receiving digital signals and converting said digital signals into analog signals in accordance with said sampling pulse signal;

a magnetic disc unit for recording, storing and reproducing digital signals;

a magnetic disc control means coupled to said magnetic disc unit and comprising a write signal generator for producing a write signal and a read signal generator for producing a read signal, said magnetic disc control means causing said magnetic disc unit to record said digital signals at a rate corresponding to the rate of said write signal and to reproduce said digital signals at a rate corresponding to the rate of said read signal;

at least two buffer memory means, comprising random access memories having a plurality of memory locations and a rate control input, for recording digital signals and for reproducing digital signals at a rate corresponding to the rate of the signal applied to said rate control input;

a buffer control means coupled to said sampling pulse signal generator, said modulator, said demodulator, said magnetic disc control means and said at least two buffer memory means, said buffer control means operating in two manually selectable modes, wherein when said first mode is selected, said buffer control means couples said modulator to one of said at least two buffer memory means and couples said sampling pulse signal generator to said rate control input of said one of said at least one buffer memory means for recording said digital signals produced by said modulator in successive memory locations of said one of said at least two buffer memory means at a rate corresponding to the rate of said sampling pulse signal until said one of said at least two buffer memory means has recorded digital signals at each of its plurality of memory locations whereupon said buffer control means couples said modulator to a second of said at least two buffer memory means and said buffer control means couples said sampling pulse generator to said rate control input of said second of said at least two buffer memory means for storing said digital signals produced by said modulator in successive memory locations of said second of said at least two buffer memory means at a rate corresponding to the rate of said sample pulse signal, said buffer control means couples said magnetic disc control means to said one of said at least two memory means and said buffer control means couples said write signal generator to said rate control input of said one of said at least two buffer memory means for reproducing digital signals stored in successive memory locations of said one of said at least buffer memory means at a rate corresponding to the rate of said write signal and for recording said digital signals in said magnetic disc unit until said one of said at least two buffer memory means has reproduced said digital signals stored in each of its plurality of memory locations whereupon said buffer control means couples said magnetic disc control unit to a second of said at least two memory means and said buffer control means couples said write signal generator to said rate control input of said second of said at least two buffer memory means for reproducing said digital signals stored in successive memory locations of said second of said at least two buffer memory means at a rate corresponding to the rate of said write control signal and for recording said digital signals in said magnetic disc unit, whereby each of said at least two buffer memory means in turn records digital signals produced by said modulator and reproduces said recorded digital signals for recording in said magnetic disc unit; and wherein when said second mode is selected, said buffer control means couples said magnetic disc control unit to one of said at least two of said buffer memory means and said buffer control means couples said read signal generator to said rate control input of said one of said at least two of said memory means for recording digital signals reproduced by said magnetic disc unit in successive memory locations of said one of said at least two of said buffer memory means at a rate corresponding to the rate of said read signal until said one of said at least two of said buffer memory means has recorded digital signals at each of its plurality of memory locations whereupon said buffer control means couples said magnetic disc control unit to a second of said at least two buffer memory means and said buffer control means couples said read signal generator to said rate control input of said second of said at least two buffer memory means for recording digital signals reproduced by said magnetic disc unit in successive memory locations of said second of said at least two buffer memory means at a rate corresponding to the rate of said read signal and said buffer control means couples said demodulator to said one of said at least two buffer memory means and said buffer control means couples said sampling pulse signal to said rate control input of said one of said at least two buffer memory means for reproducing digital signals stored in successive memory locations of said one of said at least two buffer memory means at a rate corresponding to the rate of said sampling pulse signal and for applying said reproduced digital signals to said demodulator until said one of said at least two buffer memory means has reproduced said digital signals stored in each of its plurality of memory locations whereupon said buffer control means couples said demodulator to said second of said at least two buffer memory means and said buffer control means couples said sampling pulse signal to said rate control input of said second of said at least two buffer memory means for reproducing said digital signals stored in successive memory locations of said second of said at least two buffer memory means at a rate corresponding to the rate of said sampling pulse signal for applying said reproduced digital signals to said demodulator, whereby each of said at least two buffer memory means in turn records said digital signals reproduced by said magnetic disc unit and reproduces said recorded digital signals for applying said recorded digital signals to said demodulator;

and a central processing unit for controlling said sampling pulse signal generator, said modulator, said demodulator, said magnetic disc control means, said buffer memory means and said buffer control means, and said central processing unit being connected to said buffer memory for transferring digital signals therebetween wherein digital signals in said central processing unit are recorded by said magnetic disc unit through said at least two buffer memory means and digital signals recorded by said magnetic disc unit are transferred to said central processing unit through said buffer memory means.

2. A random access digital signal recording and reproducing system as claimed in claim 1, wherein:
said at least two buffer memory means comprise first and second buffer memory means;
said buffer control means comprises;
a first and second address counting means, respectively associated with said first and second buffer memory means, for specifying the memory location of said associated buffer memory means for the recording or reproduction of digital signals therein, and
a memory function control means for controlling said first and second buffer memory means, wherein when said first buffer memory means is recording, said second buffer memory means is reproducing and when said first buffer memory means is reproducing, said second buffer memory means is recording.

3. A random access digital signal recording and reproducing system as claimed in claim 2, further comprising:
at least one additional set comprising a sampling pulse signal generator, a modulator, a demodulator, at least two buffer memory means and a buffer control means, each of said additional sets coupled to said magnetic disc control unit in the same manner as the set comprising said sampling pulse generator, modulator, demodulator, at least two buffer memories and buffer control means.

4. A random access digital signal recording and reproducing system as claimed in claim 2, further comprising:
a data transfer means coupled to said central processing unit and said buffer control means for transferring digital signals from said central processing unit to specific memory locations of said at least two buffer memory means by causing said associated address counting means to specify said specific memory locations and causing said buffer control means to operate in said first mode for transferring said digital signals to said magnetic disc control means for recording in said magnetic disc unit and for causing said buffer control means to operate in said second mode for transferring said digital signals reproduced by said magnetic disc unit from said magnetic disc control means to said at least two buffer memory means and for transferring digital signals from specific memory locations of said at least two buffer memory means to said control processing unit by causing said associated address counting means to specify said specific memory locations.

5. A random access digital signal recording and reproducing system as claimed in claim 1, said buffer control means comprising:
an address counting means associated with each of said at least two buffer memory means for specifying the memory location of said associated buffer memory means for recording or reproducing digital signals of said associated buffer memory means, and for producing an overflow signal when said associated buffer memory means has recorded digital signals in each of its plurality of memory locations and for producing an overflow signal when said associated buffer memory means has reproduced digital signals from each of its plurality of memory locations; and a clock switching means associated with each of said at least two buffer memory means and coupled to said sampling pulse signal generator and to said magnetic disc control means for coupling said sampling pulse signal to said rate control input of its associated buffer memory means when said associated buffer memory means records digital signals produced by said modulator, and for coupling said sampling pulse signal to said rate control input of its associated buffer memory means when said associated buffer memory means reproduces digital signals for applying said digital signals to said demodulator, and for coupling said write signal to said rate control input of its associated buffer memory means when said associated buffer memory means reproduces digital signals for recording in said magnetic disc unit and for coupling said reas signal to said rate control input of its associated buffer memory means when said associated buffer memory means records digital signals reproduced from said magnetic disc unit.

* * * * *